(12) United States Patent
Mannings et al.

(10) Patent No.: US 6,334,152 B1
(45) Date of Patent: *Dec. 25, 2001

(54) INFORMATION SYSTEM

(75) Inventors: Robin Thomas Mannings; David Lynton Gibson, both of Ipswich (GB)

(73) Assignee: British Telecommunications plc, London (GB)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/043,308
(22) PCT Filed: Feb. 5, 1998
(86) PCT No.: PCT/GB98/00340
  § 371 Date: Mar. 18, 1998
  § 102(e) Date: Mar. 18, 1998
(87) PCT Pub. No.: WO98/36552
  PCT Pub. Date: Aug. 20, 1998

(30) Foreign Application Priority Data

Feb. 13, 1997 (GB) ................................................ 97300929

(51) Int. Cl.[7] ...................................................... G06F 15/16
(52) U.S. Cl. .......................... 709/227; 709/217; 709/227; 709/238; 340/10.3; 340/825.03
(58) Field of Search .................................. 709/217, 227, 709/225, 229, 232, 238; 340/825.03, 10.1, 10.3

(56) References Cited

U.S. PATENT DOCUMENTS 4,789,895  12/1988  Mustafa et al. .

(List continued on next page.)

FOREIGN PATENT DOCUMENTS 32 07 022 A   9/1983  (DE) .

(List continued on next page.)

OTHER PUBLICATIONS

Kylanpaa M, Pihlajamaa O and Bergenwall M: "Nomadic Access to Information Services by a GSM Phone" Computers & Graphics, vol. 20, No. 5, Sep. 1996, p. 651–658, XP002037372.

(List continued on next page.)

*Primary Examiner*—Robert B. Harrell
*Assistant Examiner*—Stephan Willet
(74) *Attorney, Agent, or Firm*—Nixon & Vanderhye, P.C.

(57) ABSTRACT

An interactive information delivery system server delivering text or other visual data to a display unit is accessed by a user by means of his own telephone, through an interface unit. The interface unit interprets key pad presses and/or voice commands, and in response to these it controls the server. This allows the expensive and vulnerable hardware (which may be a conventional PC and modem) to be positioned in a secure location, but still be usable by members of the public. As the location of the display unit (which may be a conventional PC and modem) may make audio output impractical, the interface unit may pass an audio channel from the server to the user's telephone. In response to appropriate commands from the telephone, it can also divert the call to a predefined call centre. The server application scripts and control programs largely follow normal WWW Internet practice, except that the output from the server is to be transmitted to a destination (display unit) other than that from which the instructions arrive (the interface). The display unit, when in idle mode, displays a page or pages in the idle state, including a telephone number to dial in order to access information. This number will be specific to the display unit, allowing the interface unit to identify which display unit the user wishes to use.

15 Claims, 2 Drawing Sheets

U.S. PATENT DOCUMENTS

| | | |
|---|---|---|
| 4,965,821 | 10/1990 | Bishop et al. . |
| 5,236,199 | 8/1993 | Thompson, Jr. . |
| 5,479,408 * | 12/1995 | Will . |
| 5,487,100 * | 1/1996 | Kane . |
| 5,521,589 * | 5/1996 | Mondrosch et al. . |
| 5,577,041 * | 11/1996 | Sharma et al. . |
| 5,619,684 * | 4/1997 | Goodwin et al. . |
| 5,675,507 * | 10/1997 | Bob, II . |
| 5,694,120 * | 12/1997 | Indekeu et al. . |
| 5,712,901 * | 1/1998 | Meermans . |
| 5,715,370 * | 2/1998 | Luther et al. . |
| 5,729,549 * | 3/1998 | Kostreski et al. ............... 370/522 |
| 5,742,905 * | 4/1998 | Pepe et al. ........................ 455/461 |
| 5,751,707 * | 5/1998 | Voit et al. ........................ 370/384 |
| 5,796,394 * | 8/1998 | Wicks et al. . |
| 5,802,150 * | 9/1998 | Beck et al. . |
| 5,805,997 * | 9/1998 | Farris .............................. 455/461 |
| 5,835,762 * | 11/1998 | Gans et al. . |
| 5,864,673 * | 1/1999 | Ohto et al. . |
| 5,892,909 * | 4/1999 | Grasso et al. . |
| 5,915,207 * | 6/1999 | Dao et al. ........................... 455/9 |
| 5,918,158 * | 6/1999 | LaPorta et al. . |
| 5,933,478 * | 8/1999 | Ozaki et al. . |
| 5,948,061 * | 9/1999 | Merriman et al. . |
| 5,956,651 * | 9/1999 | Willkie et al. .................... 455/553 |
| 5,959,543 * | 9/1999 | LaPorta et al. . |
| 5,973,683 * | 10/1999 | Cragun et al. . |
| 6,014,559 * | 1/2000 | Amin . |

FOREIGN PATENT DOCUMENTS

| | | | |
|---|---|---|---|
| 43 42 776 A | | 6/1995 | (DE) . |
| 0710 017 A | | 5/1996 | (EP) . |
| WO 92 14329 A | | 8/1992 | (WO) . |
| WO 97/41654 * | | 11/1997 | (WO) .............................. H04H/1/00 |
| WO 00/04475 * | | 1/2000 | (WO) . |
| WO 00/04476 * | | 1/2000 | (WO) . |

OTHER PUBLICATIONS

"Integrated Web and Telephone Service Creation" Bell Labs Technical Journal, XP002036350 p. 21, 30, and 33.

Digest of Papers of the Computer Society Computer Conference (Spring) Compcon, Technologies for the Information Superhigh way San Francisco, Mar. 1995, No. Conf. 40, Mar. 1995, Institute of Electrical and Electronics Engineers, p. 209–215, XP000545431 Haskin R L et al: "A System for the Delivery of Interactive Television Programming".

* cited by examiner

INFORMATION SYSTEM

BACKGROUND OF THE INVENTION

1. Field of the Invention

This invention relates to interactive computer information display systems for displaying text or other visual information. Such systems are coming into widespread use, through information access systems such as the "Internet" World Wide Web (WWW). Large amounts of information are available to users having access to such systems. However, in order to gain access to such systems relatively expensive hardware is required, in particular a computer and a modem, limiting the availability of the information to users who have access to such a terminal. Furthermore, the hardware is typically bulky, and is not easily portable. Mobile systems, comprising a "laptop" computer and a cellular telephone, do exist, but because of the limited bandwidth available on mobile communications, these tend to be very slow.

2. Related Art

U.S. Pat. No. 5,236,199 (Thompson) and U.S. Pat. No. 4789895 (Mustafa) describe systems in which narrowband telephone links are used to control images presented via a broadband system (e.g. a cable television downlink), but in both cases the telephone lines are fixed, and dedicated to a specific display unit. These systems therefore require the user to have the use of such a device. Because the links are necessarily fixed it is not possible to use such an arrangement for a mobile user.

Multimedia "kiosks" have been proposed for locations to which the public have access. However, the equipment is valuable, and its accessibility to the public makes it vulnerable to theft, vandalism, and tampering. The equipment is also not suitable for exposed locations, as it is not in general weatherproof. In order to identify the user, and allow payment to be made for the service, facilities such as a credit card "swipe" unit and/or personal identity number (PIN) facility are also necessary. The use of PINs is vulnerable to people reading a genuine user's keystrokes as he enters his PIN, in order to subsequently use the PIN himself.

SUMMARY OF THE INVENTION

According to a first aspect of the invention, there is provided an interactive information delivery system comprising an information display unit, server means for transmitting text or other visual information from an information store over a delivery communications link to the information display unit, and a user interface for receiving control commands over a mobile communications link, for identifying from the control commands the information display unit to be controlled by said commands, and for transmitting the control commands to the server means to select the information to be transmitted to the display unit.

According to a second aspect, there is provided a user interface for an interactive information delivery system comprising means for receiving control commands over a mobile telecommunications link, and means for transmitting commands to an information server means, for controlling the server means to access text or other visual data from an information store and transmit said visual data over a delivery communications link, the delivery communications link being selected according to said control commands received over the mobile telecommunications link.

According to a third aspect, there is provided a method of operating an interactive information delivery system comprising the steps of:

transmitting control information to a server over a mobile telecommunications link;

controlling the server in response to said control information to select a delivery communications link;

controlling the server to select text or other visual information for transmission over the delivery communications link in response to said control information;

transmitting said information from the server over the selected delivery communications link for display on a display unit.

The inputting and use of control information to select the delivery communications link allows the service to be provided to any user with a mobile telephone who is within sight of the display unit, even though there is no direct physical connection or organisational association between them. The control command may be displayed on the display device when in idle mode, for inputting via the mobile telephone by the user when required. The human user completes the loop between the display of the appropriate prompt on the display device and the inputting of the command on the mobile telephone, by way of his eyes, brain and fingers.

This arrangement has a number of advantages. In particular, this approach requires only standard computer hardware to display the information. As users require no physical contact with the display unit, it can be positioned anywhere visible to potential users, without being exposed to the elements or the attentions of vandals, thieves, etc, for example a shop window.

In such a position it may be difficult to deliver an audio channel, as is required by many multimedia services. To overcome this, the server means can be arranged to transmit audio information to the user by means of the mobile communications link.

Because only command information, and possibly an audio return channel, are transmitted over the mobile communications link, a narrow-bandwidth system can be used for this link, without impairing the response speed of the system, which is limited only by the bandwidth of the delivery telecommunications link. The mobile communications link is preferably a dial-up connection made by the user, from the user's own cellular mobile telephone. This allows user identification and payment to be provided readily through the billing system, if required. Furthermore, the need to use a cellular telephone would discourage frivolous customers. There is no need for access controls to prevent unauthorised use, other than those already provided by the mobile phone operator. In particular, if an access code (PIN) is required to identify the user, it is of no use to a "shoulder surfer" observing the user's keystrokes unless he has access to the user's telephone itself.

In order to control the display and to "browse" the information, the user would use the telephone connection. After dialling a number indicated on the display unit when in idle mode (the number being specific to the display unit to be used), the user would move from page to page by either pressing the keypad as instructed, either by information on the screen, or by simple voice commands. At key places in the display program, a command could allow the user to be connected to a further telecommunications link. This may be a telephone help desk, where for example, a customer's order may be taken. The help desk may have provision for itself transmitting commands to the server to display information on the display device, allowing the help desk operator to control the session and display information likely to be of interest to the other user.

The display unit may be associated with a video input means, the system further comprising means for transmitting video signals from the video input means to the further telecommunications line, for example to allow a videoconference to take place.

To reduce the user's call charges, the system could also be used to call back the user when a session is initiated, thereby transferring the cost of provision to the information provider.

The display unit could be a PC and browser, controlled remotely by the user through the first and second communications links, either by voice commands or keystrokes. Costs could be further reduced by replacing the display unit by a Network Computer.

The invention can be used with either analogue or digital telephone systems (which term embraces Internet Protocol systems as well as conventional switched systems) as the mobile communications link, and with public switched telephone network (PSTN), Integrated Services Digital Network (ISDN), Private Circuit or Local Area Network (LAN) connections as the delivery communications link (which will generally be fixed). Likewise, the relative physical locations of the display unit, user interface unit and server can also be varied.

BRIEF DESCRIPTION OF THE DRAWINGS

The invention will now be described with reference to the drawings, in which.

DETAILED DESCRIPTION OF EXEMPLARY EMBODIMENTS

Figure 1:
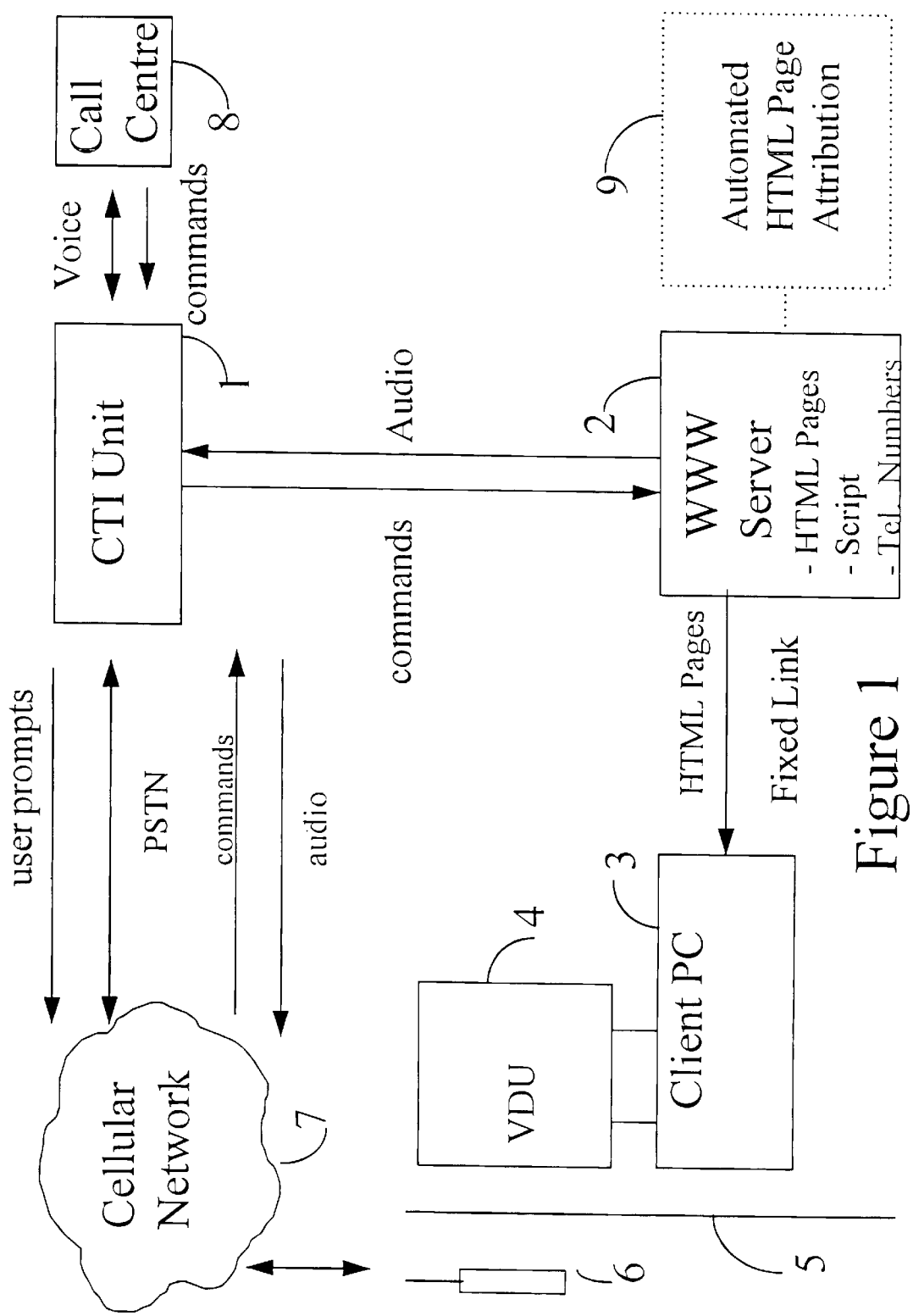
FIG. 1 is a block diagram illustrating the interrelationships between the various functional elements which co-operate to form one embodiment of the invention.
Figure 2:
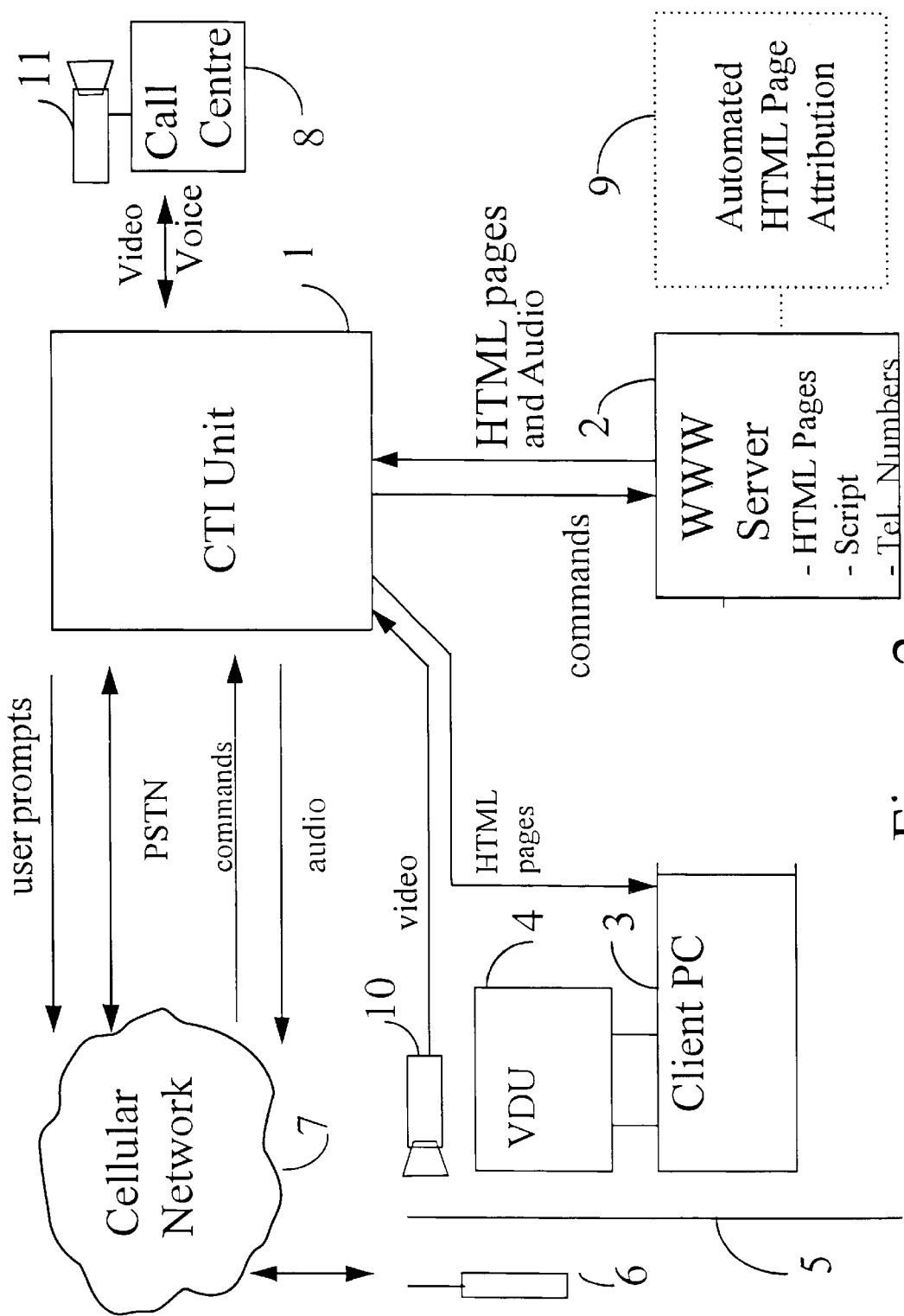
FIG. 2 is a block diagram illustrating an alternative configuration.

The systems of both FIGS. 1 and 2 comprise two network based sub-systems; firstly a computer telephony integration (CTI) unit 1 which acts as a user interface, and secondly a WWW (World-wide web) Internet server 2. The interface unit 1 controls the WWW server 2. The server 2 is connected by a fixed link, e.g. PSTN, ISDN, LAN, etc, to a display unit 3, typically a standard PC and modem with standard WWW browser client software, and having a visual display unit (VDU) 4. In the arrangement shown in FIG. 1, this link is direct, whilst in FIG. 2 it is made by way of the user interface. The visual display unit 4 is located in a position where it can be seen by users, but protected from weather, vandals, theft, etc, for example behind a window 5. Users do not need physical access to the display unit 3 or the VDU 4, as control of the display is carried out remotely, as will be described later.

A user having a mobile cellular telephone 6 can access information for display on the VDU 4 by dialling a telephone number specific to the display unit 3 and displayed on the VDU 4 when in idle mode. This enables connection to be made from the telephone 6, through a telephone network 7, to the interface unit 1, and thus to the server 2. The interface unit converts voice or keypad commands transmitted to it from the telephone 6 into instructions to the server to transmit the required data to the display unit 3. The function of a mobile telephone can be subsumed into a personal mobility terminal, making use of internet protocols. Mobile control access could then be made using a Mobile IP (internet protocol) session.

The interface unit 1 is also capable of connection to a call centre 8 to allow a voice link to be made between the telephone 6 and the call centre 8, for example for use as a help line, or in order to place a purchase order, to allow the user to be presented, by the call centre operator, with pages of interest etc.

As shown in FIG. 2, both the display unit 3 and call centre 8 may be provided with video cameras, for generating images to be transmitted to each other by way of the interface unit 1.

The operation of the system will now be described.

The interface unit 1 answers telephone calls made to the number displayed on the VDU 4 when the client PC is in idle mode. The interface unit 1 then interprets the key pad presses and/or voice commands, and in response to these it identifies the display unit 3,4 to be controlled and commands the appropriate server 2 to initialise a session, and then to move from page to page.

The interface unit 1 can also pass an audio feed from the server 2 to the user's telephone 6, which may include speech prompts to support visual prompts displayed on the VDU 4. In response to appropriate commands from the telephone 6, it can also divert the call to a predefined call centre.

At the end of the session, the interface unit 1 clears the call and commands the WWW server to reset to idle. It also logs any charges incurred for use of the system, for billing either to the user's telephone account, or to a separate account previously identified during the initialisation process.

In a variant of this embodiment, the interface unit 1 also stores customer information, e.g. account details and telephone numbers. On answering a call, the interface unit checks the customer's identity, using calling line identity (CLI) signals generated by the telephone network on call set-up, and if the customer is identified as having an account, the interface unit 1 immediately clears the call and dials back to the user's telephone 6, using the calling line identity. This reduces call charges to the user.

The Internet WWW server 2 has associated CGI (Common Gateway Interface) scripts and control programs. The CGI script generates user-specific interactive content, such as page counters and password systems, if required. The CGI script and control programs largely follow normal WWW Internet practice except that the output from the server is to be transmitted to a destination (display unit 3) other than that from which the instructions arrive (the interface 2).

Future realisations could include a distributed approach using "Object Broker" technology, in which the application makes use of a distributed architecture. The application scripts provide a static page, or a set of "rolling" pages, specific to the display unit 3 when idle using "Server Push" technique. On command from the interface unit 1 the server 2 handles the communications session to the display unit 3 and transmits the required pages to the display unit 3 as determined by an application script program. It also transmits any audio signals to the interface unit 1. In one form, the server 2 may be arranged to transmit the same data, including both audio and visual, to both the interface unit 1 and the display unit 3, the interface unit being arranged to select the audio signal for onward transmission to the user's telephone 6 also. In this arrangement the display unit 3 receives the audio channel as well as the visual information, but because of its position behind a window 5 this may not be audible to the user. Indeed, the display unit 3 need not be fitted with an audio output.

In another arrangement, shown in FIG. 2, the server 2 transmits the visual information (as well as any audio signal) to the interface unit 1, which itself transmits the visual information to the display unit 3. This removes the need to modify the server 2 to transmit information to a destination other than that from which its control instructions come. This arrangement is functionally equivalent to the arrangement of FIG. 1, the interface 1 merely relaying the visual information from the server 2 to the display unit 3. The server 2 reverts to the idle state when commanded by the interface unit 1.

A basic realisation of the server 2 would use individually composed HTML pages in the server, with the prompts inserted during manual creation. In an enhanced system an extra sub-system 9 would interpret standard WWW pages and automatically produce the necessary screen prompts to guide the user through the data system. Alternatively, as shown in FIG. 1, HTML commands for controlling the display may be transmitted from the call centre 8 to the interface unit 1.

As shown in FIG. 2, the display unit 3 may be associated with a video camera 10, for transmitting video images to the interface unit 1 (either using an Internet Protocol application or as an ISDN application), and hence to the call centre 8 or to another user. Video images may also be transmitted in the reverse direction, from a camera 11, for display on the display device, thereby allowing a video conference to take place. It will be apparent that both these optional features may be used, singly or in combination, in either embodiment.

The display unit 3, which is a conventional PC and modem, when in idle mode displays a page or pages in the idle state, including a telephone number to dial in order to access information. This number will be specific to the display unit, allowing the interface unit 1 to identify which display unit the user wishes to use. Alternatively, information about the location of the user may be extracted from the cellular radio system, or by using calling line identity if the call is from a fixed telephone, in order to identify the whereabouts of the user and therefore which display unit he is viewing.

The display unit 3 receives new pages transmitted from the WWW server 2, and is also capable of rebooting into the WWW browser application and re-establishing communications to the server 2 if a problem occurs (e.g. power failure).

Each display system 3/4 that is deployed would have a unique application script (set of instructions) in the server 2, which associates an HTML page with the key/voice commands required to go to other pages or to the call centre 8. The telephone numbers by which to contact the interface unit 1 (which is specific to the display unit 3) and the call centre 8 would also appear in the script.

What is claimed is:

1. An interactive information delivery system comprising:
   a first terminal comprising an information display unit,
   server means for transmitting text or other visual information from an information store over a first communications link to the first terminal,
   the text or other visual information including control command prompts, and
   a user interface having:
   means for receiving at least one of dialing and dialed telephone number information, and control commands from a second terminal separate from the first terminal over a second communications link separate from the first communications link,
   means for identifying from the at least one of dialing and dialed telephone number information the information display unit to be controlled by said control commands, and
   means for transmitting the control commands to the server means to select the information to be transmitted to the display unit,
   whereby the separated first and second terminals are arranged to cooperate through the server to enable control commands to be transmitted to the server from the first terminal over the first communications link in response to control command prompts displayed by the second terminal, the separated first and second terminals cooperating as display and data entry elements of the same user interface.

2. An interactive information delivery system as in claim 1, wherein:
   the server means is arranged to transmit audio information to a user by means of the mobile communications link.

3. An interactive information delivery system as in claim 2, wherein:
   the user interface includes means for setting up a telephone connection between the user interface and a further communications link.

4. An interactive information delivery system as in claim 3, wherein:
   the further communications link is arranged to transmit commands to the information server.

5. An interactive information delivery system as in claim 3, wherein:
   the display unit is associated with a video input means,
   the system further comprising means for transmitting video signals from the video input means to the further communications link.

6. A user interface for an interactive information delivery system comprising:
   means for receiving at least one of dialing and dialed telephone number information and control commands from a first terminal over a first communications link, and
   means for transmitting commands to an information server means, for controlling the server means to access text or other visual data from an information store,
   the text or other visual data including:
   control command prompts, and
   means for transmitting said visual data over a second communications link separate from the first communications link to a second terminal separated from said first terminal, the second communications link being selected according to said at least one of dialing and dialed telephone number information received over the first communications link and connected to a search terminal whereby the separated first and second terminals are arranged to cooperate through the server to enable control commands to be transmitted to the server from the first terminal in response to control command prompts displayed by the second terminal, the first and second terminals cooperating as display and data entry elements of the same user interface.

7. A user interface as in claim 6, having:
   means for receiving audio data from a server means, and
   means for transmitting said audio data over the mobile telecommunications link.

8. A user interface as in claim 6, further comprising:
   means for setting up a connection between the user interface and a further communications link.

9. A user interface as in claim 8, having:

means for receiving visual data from the information server means over the delivery communications link and transmitting said visual data over the further communications link.

10. A user interface as in claim 8, wherein:

the further communications link is connected to means for transmitting commands to the information server.

11. A method of operating an interactive information delivery system, said method comprising:

transmitting at least one of dialing and dialed telephone number information and control commands to a server over a first communications link from a first terminal;

controlling the server in response to said at least one of dialing and dialed telephone number information to select a second communications link separate from the first communications link;

controlling the server to select text or other visual information for transmission over the delivery communications link to a second terminal separate from said first terminal in response to said control commands, the text or other visual information including control command prompts; and transmitting said information from the server over the selected second communications link for display on a display unit at said second terminal whereby the separated first and second terminals are arranged to cooperate through the server to enable control commands to be transmitted to the server from the first terminal in response to control command prompts displayed by the second terminal, the first and second terminals cooperating as display and data entry elements of the same user interface.

12. A method as in claim 11, wherein:

audio information is transmitted from the server to a user by means of the mobile communications link.

13. A method as in claim 11, further comprising the step of:

controlling the user interface to set up a connection between the user and a further communications link.

14. A method as in claim 13, wherein:

visual data is transmitted from the information server means over the delivery communications link to the further telecommunications line.

15. A method as in claim 13, wherein:

the further communications link is connected to means for transmitting commands to the information server.

* * * * *